US009906953B2

(12) United States Patent
Du et al.

(10) Patent No.: US 9,906,953 B2
(45) Date of Patent: Feb. 27, 2018

(54) METHOD AND USER EQUIPMENT FOR DISCOVERING DEVICE USER

(71) Applicant: HUAWEI DEVICE (DONGGUAN) CO., LTD., Dongguan (CN)

(72) Inventors: Zhenguo Du, Shenzhen (CN); Ping Fang, Shenzhen (CN); Zhiming Ding, Shenzhen (CN); Gaokun Pang, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 14/823,080

(22) Filed: Aug. 11, 2015

(65) Prior Publication Data
US 2015/0350897 A1 Dec. 3, 2015

Related U.S. Application Data

(63) Continuation of application No. PCT/CN2014/079124, filed on Jun. 4, 2014.

(30) Foreign Application Priority Data

Jun. 7, 2013 (CN) .......................... 2013 1 0225872

(51) Int. Cl.
H04M 1/66 (2006.01)
H04W 12/04 (2009.01)
(Continued)

(52) U.S. Cl.
CPC ............ *H04W 12/04* (2013.01); *G06F 21/00* (2013.01); *H04L 61/1547* (2013.01);
(Continued)

(58) Field of Classification Search
CPC ........ H04W 12/06; H04W 12/12; H04L 63/08
(Continued)

(56) References Cited

U.S. PATENT DOCUMENTS

2004/0266533 A1* 12/2004 Gentles .................. G06F 21/32
463/42
2011/0128882 A1 6/2011 Shimizu et al.
(Continued)

FOREIGN PATENT DOCUMENTS

CN 101404576 A 4/2009
CN 101510902 A 8/2009
(Continued)

OTHER PUBLICATIONS

Partial English Translation and Abstract of Chinese Patent Application No. CN101404576, dated Aug. 12, 2015, 6 pages.
(Continued)

Primary Examiner — Nghi H Ly
(74) Attorney, Agent, or Firm — Conley Rose, P.C.

(57) ABSTRACT

A method and user equipment for discovering a device user to improve security of user identifier information, so that user equipment discover each other securely. The method includes receiving a first message that is sent by a second user equipment and at least includes implicit user identifier information of the second user equipment, obtaining, according to correspondences stored in a first user equipment, a user identifier corresponding to the implicit user identifier information of the second user equipment; and determining, in the user identifier corresponding to the implicit user identifier information of the second user equipment, a user identifier of the second user equipment, to discover a user of the second user equipment. The present disclosure is applicable to the field of communications.

12 Claims, 8 Drawing Sheets

(51) Int. Cl.
  *H04W 76/02* (2009.01)
  *H04L 29/12* (2006.01)
  *G06F 21/00* (2013.01)
  *H04L 29/06* (2006.01)
  *H04L 29/08* (2006.01)
  *H04W 12/02* (2009.01)

(52) U.S. Cl.
  CPC .............. *H04L 63/00* (2013.01); *H04L 63/08* (2013.01); *H04L 67/16* (2013.01); *H04W 12/02* (2013.01); *H04W 76/023* (2013.01); *H04L 61/605* (2013.01)

(58) Field of Classification Search
  USPC ........................... 455/411, 410, 414.1, 422.1
  See application file for complete search history.

(56) References Cited

U.S. PATENT DOCUMENTS

| 2012/0311686 | A1 | 12/2012 | Medina et al. |
| 2013/0103765 | A1 | 4/2013 | Papakipos et al. |
| 2013/0151608 | A1* | 6/2013 | Wiseman ................ H04W 4/02 709/204 |

FOREIGN PATENT DOCUMENTS

| CN | 102333279 A | 1/2012 |
| KR | 20100066853 A | 6/2010 |

OTHER PUBLICATIONS

Partial English Translation and Abstract of Chinese Patent Application No. CN101510902, dated Aug. 12, 2015, 5 pages.
"Marketing Requirements Document for Interoperability Testing of Neighbor Awareness Network," Wi-Fi Alliance, Neighbor Awareness Networking, Marketing Task Group, Version 0.07, 2012, 27 pages.
"Wi-Fi Peer-to-Peer (P2P) Technical Specification," Wi-Fi Alliance, Version 1.2, 2010, 161 pages.
Foreign Communication From A Counterpart Application, PCT Application No. PCT/CN2014/079124, English Translation of International Search Report dated Sep. 3, 2014, 3 pages.
Foreign Communication From A Counterpart Application, PCT Application No. PCT/CN2014/079124, Written Opinion dated Sep. 3, 2014, 6 pages.
Foreign Communication From A Counterpart Application, European Application No. 14807807.4, Extended European Search Report dated Mar. 14, 2016, 5 pages.
Foreign Communication From A Counterpart Application, Chinese Application No. 201310225872.3, Chinese Office Action dated Mar. 10, 2017, 8 pages.

* cited by examiner

CONT. FROM FIG. 3A

CONT. FROM FIG. 3A

307. The second user equipment decrypts the first encryption value by using the user identifier of the second user equipment and the user identifier corresponding to the implicit user identifier information of the first user equipment, to determine the user identifier of the first user equipment 308. The second user equipment encrypts the determined user identifier of the first user equipment by using the user identifier of the second user equipment and the obtained user identifier of the first user equipment, to obtain a second encryption value 309. The second user equipment sends the second encryption value to the first user equipment 310. The first user equipment decrypts the second encryption value by using the user identifier of the first user equipment and the user identifier corresponding to the implicit user identifier information of the second user equipment, to obtain a decryption result 311. The second user equipment sends a discovery failure message to the first user equipment 312. The first user equipment sends a discovery failure message to the second user equipment 313. The first user equipment sends a discovery success message to the second user equipment

FIG. 3B

METHOD AND USER EQUIPMENT FOR DISCOVERING DEVICE USER

CROSS-REFERENCE TO RELATED APPLICATIONS

This application is a continuation of International Application No. PCT/CN2014/079124, filed on Jun. 4, 2014, which claims priority to Chinese Patent Application No. 201310225872.3, filed on Jun. 7, 2013, both of which are hereby incorporated by reference in their entireties.

TECHNICAL FIELD

The present disclosure relates to the field of communications, and in particular, to a method and user equipment for discovering a device user.

BACKGROUND

The social WiFi is a technology in which user equipment supporting a WiFi function perceives existence of each other by using a WiFi interface, and completes networking and communication by using the WiFi interface.

In a social WiFi friend discovery application, to discover and identify other user equipment, each user equipment needs to broadcast its identifier information. The social WiFi is implemented by using WiFi Direct, where WiFi Direct is also referred to as a wireless peer-to-peer network (WiFi P2P). In WiFi Direct, a user equipment broadcasts its existence by sending a Probe Request frame, to complete a user equipment discovery or a service discovery.

In an existing WiFi mechanism, each user equipment broadcasts its identifier information by using plaintext, which cannot ensure security of user identifier information, and may lead to problems such as privacy leakage.

SUMMARY

Embodiments of the present disclosure provide a method and user equipment for discovering a device user, to improve security of user identifier information, so that user equipment discover each other securely.

To achieve the foregoing objective, the following technical solutions are used in the embodiments of the present disclosure.

According to a first aspect, a method for discovering a device user is provided, where the method is applied to a first user equipment, a correspondence between a user identifier of the first user equipment and implicit user identifier information of the first user equipment and a correspondence between a user identifier of at least one other user equipment and implicit user identifier information of the at least one other user equipment are stored in the first user equipment, and the method includes receiving a first message that is sent by a second user equipment and at least includes implicit user identifier information of the second user equipment, obtaining, according to the correspondences stored in the first user equipment, a user identifier corresponding to the implicit user identifier information of the second user equipment, and determining, in the user identifier corresponding to the implicit user identifier information of the second user equipment, a user identifier of the second user equipment, to discover a user of the second user equipment, where the identifier of the first/second user equipment is a plaintext user identifier of the user identifier of the first/second user equipment, and the implicit user identifier information of the first/second user equipment is information obtained after at least the user identifier of the first/second user equipment is processed by using a predetermined function or a predetermined algorithm; or, the user identifier and the implicit user identifier information of the first/second user equipment are two identifiers that are allocated by a server to the first/second user equipment and are corresponding to a same user equipment.

According to the first aspect, in a first possible implementation manner of the first aspect, the predetermined function is a hash function, and the implicit user identifier information of the first/second user equipment is information obtained after hash conversion is performed on at least the user identifier of the first/second user equipment by using the hash function.

According to the first aspect, in a second possible implementation manner of the first aspect, the predetermined algorithm is a public-private key algorithm, and the implicit user identifier information of the first/second user equipment is a key generated by mapping the user identifier of the first/second user equipment by using the public-private key algorithm, or, the predetermined algorithm is an encryption algorithm based on a public-private key algorithm, and the implicit user identifier information of the first/second user equipment is an encryption value obtained by encrypting the user identifier of the first/second user equipment by using a key that is generated by mapping the user identifier of the first/second user equipment by using the public-private key algorithm.

With reference to the first aspect, the first possible implementation manner of the first aspect, or the second possible implementation manner of the first aspect, in a third possible implementation manner of the first aspect, the method further includes sending, to the second user equipment, a second message at least including the implicit user identifier information of the first user equipment, so that the second user equipment obtains, according to a correspondence between the user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment, and determines, in the user identifier corresponding to the implicit user identifier information of the first user equipment, the user identifier of the first user equipment, to discover a user of the first user equipment.

According to the third possible implementation manner of the first aspect, in a fourth possible implementation manner of the first aspect, the method further includes encrypting, by using the user identifier of the first user equipment and the user identifier corresponding to the implicit user identifier information of the second user equipment, the user identifier corresponding to the implicit user identifier information of the second user equipment, to obtain a first encryption value, and sending the first encryption value to the second user equipment, where that the second user equipment determines, in the user identifier corresponding to the implicit user identifier information of the first user equipment, the user identifier of the first user equipment is that the second user equipment decrypts the first encryption value by using the user identifier of the second user equipment and the user identifier corresponding to the implicit user identifier information of the first user equipment, to determine the user identifier of the first user equipment, and the method further includes: after obtaining the user identifier of the first user equipment, encrypting, by the second user equipment, the determined user identifier of the first user equipment by using the user identifier of the second user equipment and the obtained user identifier of the first user equipment, to obtain a second encryption value, and sending the second encryption value to the first user equipment, and receiving the second encryption value sent by the second user equipment, where the determining, in the user identifier corresponding to the implicit user identifier information of the second user equipment, a user identifier of the second user equipment is: decrypting the second encryption value by using the user identifier of the first user equipment and the user identifier corresponding to the implicit user identifier information of the second user equipment, to obtain a decryption result, where if the decryption result includes the user identifier of the first user equipment, the decryption result is correct, and the first user equipment determines the corresponding user identifier corresponding to the implicit user identifier information of the second user equipment as the user identifier of the second user equipment.

With reference to the first aspect or any one of the first to the fourth possible implementation manners of the first aspect, in a fifth possible implementation manner of the first aspect, the first message further includes a type of the user identifier of the second user equipment and/or the implicit user identifier information of the first user equipment, or, the first message further includes a type of the user identifier of the second user equipment, and/or, the implicit user identifier information of the first user equipment and a type of the user identifier of the first user equipment.

With reference to the third possible implementation manner of the first aspect to the fifth possible implementation manner of the first aspect, in a sixth possible implementation manner of the first aspect, the second message further includes indication information indicating that the type of the user identifier of the first user equipment is the implicit user identifier information.

According to a second aspect, the present disclosure provides a user equipment for discovering a device user, where the user equipment is a first user equipment, and the first user equipment includes: a storage unit, a receiving unit, an obtaining unit, and a determining unit; a correspondence between a user identifier of the first user equipment and implicit user identifier information of the first user equipment and a correspondence between a user identifier of at least one other user equipment and implicit user identifier information of the at least one other user equipment are stored in the storage unit, where the receiving unit is configured to receive a first message that is sent by a second user equipment and at least includes implicit user identifier information of the second user equipment, the obtaining unit is configured to obtain, according to the correspondences stored in the storage unit, a user identifier corresponding to the implicit user identifier information of the second user equipment, and the determining unit is configured to determine, in the user identifier corresponding to the implicit user identifier information of the second user equipment, a user identifier of the second user equipment, to discover a user of the second user equipment, where the user identifier of the first/second user equipment is a plaintext user identifier of the user identifier of the first/second user equipment, and the implicit user identifier information of the first/second user equipment is information obtained after at least the user identifier of the first/second user equipment is processed by using a predetermined function or a predetermined algorithm; or, the user identifier and the implicit user identifier information of the first/second user equipment are two identifiers that are allocated by a server to the first/second user equipment and are corresponding to a same user equipment.

According to the second aspect, in a first possible implementation manner of the second aspect, the predetermined function is a hash function, and the implicit user identifier information of the first/second user equipment is information obtained after hash conversion is performed on at least the user identifier of the first/second user equipment by using the hash function.

According to the second aspect, in a second possible implementation manner of the second aspect, the predetermined algorithm is a public-private key algorithm, and the implicit user identifier information of the first/second user equipment is a key generated by mapping the user identifier of the first/second user equipment by using the public-private key algorithm, or, the predetermined algorithm is an encryption algorithm based on a public-private key algorithm, and the implicit user identifier information of the first/second user equipment is an encryption value obtained by encrypting the user identifier of the first/second user equipment by using a key that is generated by mapping the user identifier of the first/second user equipment by using the public-private key algorithm.

With reference to the second aspect, the first possible implementation manner of the second aspect, or the second possible implementation manner of the second aspect, in a third possible implementation manner of the second aspect, the first user equipment further includes: a sending unit, where the sending unit is configured to send, to the second user equipment, a second message at least including the implicit user identifier information of the first user equipment, so that the second user equipment obtains, according to a correspondence between the user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment, and determines, in the user identifier corresponding to the implicit user identifier information of the first user equipment, the user identifier of the first user equipment, to discover a user of the first user equipment.

According to the third possible implementation manner of the second aspect, in a fourth possible implementation manner of the second aspect, the first user equipment further includes: an encryption unit, where the encryption unit is configured to encrypt, by using the user identifier of the first user equipment and the user identifier corresponding to the implicit user identifier information of the second user equipment, the user identifier corresponding to the implicit user identifier information of the second user equipment, to obtain a first encryption value, the sending unit is further configured to send the first encryption value to the second user equipment, where that the second user equipment determines, in the user identifier corresponding to the implicit user identifier information of the first user equipment, the user identifier of the first user equipment is that the second user equipment decrypts the first encryption value by using the user identifier of the second user equipment and the user identifier corresponding to the implicit user identifier information of the first user equipment, to determine the user identifier of the first user equipment, the receiving unit is further configured to: after the second user equipment obtains the user identifier of the first user equipment, and obtains a second encryption value by encrypting the determined user identifier of the first user equipment by using the user identifier of the second user equipment and the obtained user identifier of the first user equipment, receive the second encryption value sent by the second user equipment, and the determining unit is configured to decrypt the second encryption value by using the user identifier of the first user equipment and the user identifier corresponding to the implicit user identifier information of the second user equipment, to obtain a decryption result, where if the decryption result includes the user identifier of the first user equipment, the decryption result is correct, and the first user equipment determines the corresponding user identifier corresponding to the implicit user identifier information of the second user equipment as the user identifier of the second user equipment.

With reference to the second aspect or the first possible implementation manner of the second aspect to the fourth possible implementation manner of the second aspect, in a fifth possible implementation manner of the second aspect, the first message further includes a type of the user identifier of the second user equipment and/or the implicit user identifier information of the first user equipment, or, the first message further includes a type of the user identifier of the second user equipment, and/or, the implicit user identifier information of the first user equipment and a type of the user identifier of the first user equipment.

With reference to the third possible implementation manner of the second aspect to the fifth possible implementation manner of the second aspect, in a sixth possible implementation manner of the second aspect, the second message further includes indication information indicating that the type of the user identifier of the first user equipment is the implicit user identifier information.

The embodiments of the present disclosure provide a method and user equipment for discovering a device user, in which a first message that is sent by a second user equipment and at least includes implicit user identifier information of the second user equipment is received; a user identifier corresponding to the implicit user identifier information of the second user equipment is obtained according to correspondences stored in the first user equipment; a user identifier of the second user equipment is determined in the user identifier corresponding to the implicit user identifier information of the second user equipment, to discover a user of the second user equipment. In the solutions, user identifiers of the first user equipment and the second user equipment are processed, and when the first user equipment interacts with the second user equipment, implicit user identifier information of the first user equipment and implicit user identifier information of the second user equipment are used, which can ensure security of user identifier information of the user equipment, so that the user equipment discover each other securely.

BRIEF DESCRIPTION OF DRAWINGS

FIG. 3A and FIG. 3B are a schematic diagram of interaction of a method for discovering a device user according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

When user equipment use WiFi P2P to identify each other, each user equipment broadcasts a service or user equipment information in which the user equipment is interested by using a Probe Request frame.

When a WiFi P2P technology is used in a friend discovery application, because an objective of one user equipment identifying another user equipment is to determine whether the another equipment is a friend of the user equipment, a Probe Request frame broadcast by each user equipment carries user equipment identifier information of the user equipment.

If the user equipment identifier information of each user equipment that is broadcast by the user equipment is a plaintext identifier of the user equipment, problems of a spoofing attack and privacy leakage exist.

Certainly, although the foregoing description is mainly about the friend discovery application using the WiFi P2P technology, the foregoing description cannot limit the present disclosure to the friend discovery application using the WiFi P2P technology, and the method put forward by the embodiments of the present disclosure is applicable to various scenarios in which user equipment identify each other by using user identifiers.

Figure 1:
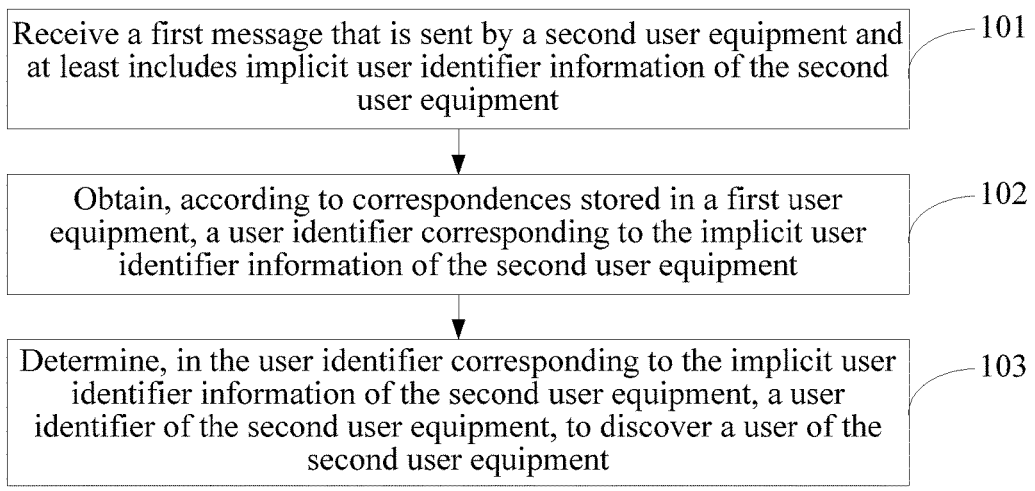
FIG. 1 is a schematic flowchart of a method for discovering a device user according to an embodiment of the present disclosure.

Based on the foregoing description, this embodiment of the present disclosure provides a method for discovering a device user. As shown in FIG. 1, the method is executed by a first user equipment, a correspondence between a user identifier of the first user equipment and implicit user identifier information of the first user equipment and a correspondence between a user identifier of at least one other user equipment and implicit user identifier information of the at least one other user equipment are stored in the first user equipment, and the method includes 101: Receive a first message that is sent by a second user equipment and at least includes implicit user identifier information of the second user equipment.

The user identifier of the first user equipment or a user identifier of the second user equipment be a plaintext user identifier of the user identifier of the first/second user equipment, and the implicit user identifier information of the first/second user equipment is information obtained after at least the user identifier of the first/second user equipment is processed by using a predetermined function or a predetermined algorithm.

Optionally, the user identifier and the implicit user identifier information of the first/second user equipment may be two identifiers that are allocated by a server to the first/second user equipment and are corresponding to a same user equipment. A mapping relationship exists between the two identifiers. For example, an application server allocates a first identifier and a second identifier to each second user equipment, and both the first identifier and the second identifier may be updated by the application server.

102: Obtain, according to the correspondences stored in the first user equipment, a user identifier corresponding to the implicit user identifier information of the second user equipment.

The first user equipment matches the implicit user identifier information of the second user equipment with the correspondence between the user identifier of the first user equipment and the implicit user identifier information of the first user equipment and the correspondence between a user identifier of at least one other user equipment and implicit user identifier information of the at least one other user equipment that are stored in the first user equipment. If matching of the implicit user identifier information of the second user equipment is successful, the user identifier corresponding to the implicit user identifier information of the second user equipment is obtained according to the correspondences.

103: Determine, in the user identifier corresponding to the implicit user identifier information of the second user equipment, the user identifier of the second user equipment, to discover a user of the second user equipment.

When the first user equipment obtains, according to the correspondences stored in the first user equipment, only one user identifier corresponding to the implicit user identifier information of the second user equipment, the user identifier is the user identifier of the second user equipment, and the first user equipment successfully discovers the user of the second user equipment. When the first user equipment obtains, according to the correspondences stored in the first user equipment, multiple user identifiers corresponding to the implicit user identifier information of the second user equipment, the first user equipment may interact with the second user equipment by using the user identifier of the first user equipment and the user identifiers corresponding to the implicit user identifier information of the second user equipment, to further complete verification on the second user equipment, to determine the user identifier of the second user equipment.

This embodiment of the present disclosure provides a method for discovering a device user, in which a first message that is sent by a second user equipment and at least includes implicit user identifier information of the second user equipment is received; a user identifier corresponding to the implicit user identifier information of the second user equipment is obtained according to the correspondences stored in the first user equipment; and a user identifier of the second user equipment is determined in the user identifier corresponding to the implicit user identifier information of the second user equipment, to discover a user of the second user equipment. By using this solution, a user identifier of the first user equipment and a user identifier of the second user equipment are processed to obtain implicit user identifier information of the first user equipment and implicit user identifier information of the second user equipment, and when the first user equipment and the second user equipment performs a discovery, the implicit user identifier information of the first user equipment and the implicit user identifier information of the second user equipment are used, which can ensure security of user identifier information of the user equipment, so that the user equipment discover each other securely.

Embodiment 2

Figure 2:
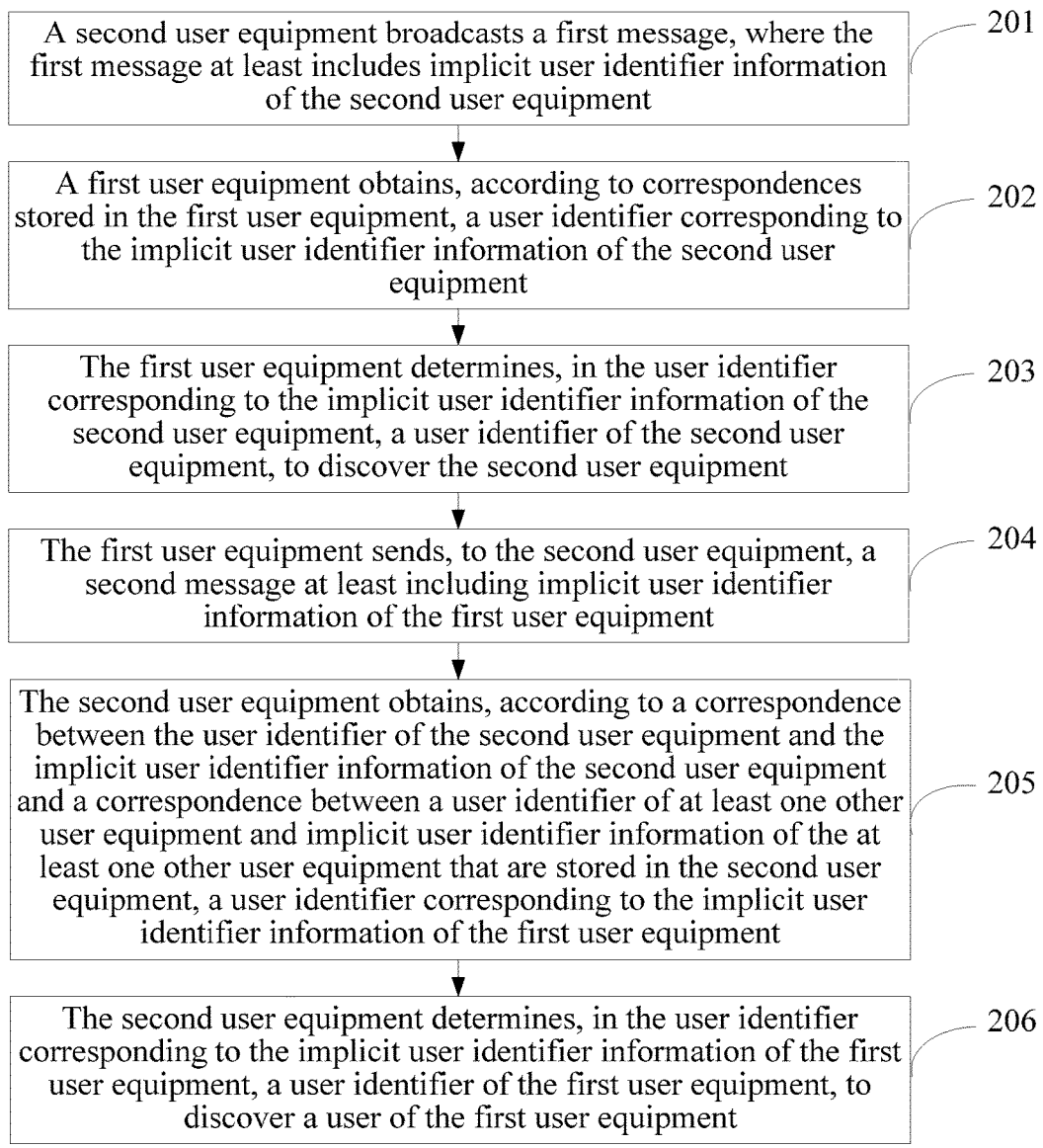
FIG. 2 is a schematic flowchart of another method for discovering a device user according to an embodiment of the present disclosure.

This embodiment of the present disclosure provides a method for discovering a device user. As shown in FIG. 2, the method includes 201: A second user equipment broadcasts a first message, where the first message at least includes implicit user identifier information of the second user equipment.

The second user equipment broadcasts, by using a broadcast message, the first message at least including the implicit user identifier information of the second user equipment, and when a first user equipment is in a broadcast range of the second user equipment, the first user equipment may receive the first message broadcast by the second user equipment.

A user identifier of the first/second user equipment may be categorized into the following two situations. The first situation: the user identifier of the first/second user equipment may be a plaintext user identifier of the user identifier of the first/second user equipment, and implicit user identifier information of the first user equipment or the implicit user identifier information of the second user equipment is information obtained after at least the user identifier of the first/second user equipment is processed by using a predetermined function or a predetermined algorithm.

The predetermined function may be a hash function, and the implicit user identifier information of the first/second user equipment is information obtained after hash conversion is performed on at least the user identifier of the first/second user equipment by using the hash function.

In hash conversion, one or more pieces of information are used as inputs, and are converted into fixed-length outputs by using a hash algorithm, and the outputs are hash values. Different inputs may be hashed to be identical outputs, and therefore, a unique input value cannot be determined from hash values.

The implicit user identifier information of the second user equipment may be information obtained after hash conversion is performed on at least the user identifier of the second user equipment by using one or more different hash functions, or information obtained after hash conversion is performed on a plaintext identifier and another numerical value of the second user equipment.

For example, if the user identifier of the second user equipment is ID2, and the user identifier of the first user equipment is ID1, the hash conversion may be Hash( ), Hash1( ), Hash2( ), Hash3( ), or the like, and the implicit user identifier information of the second user equipment may be: Hash(ID2), Hash1(ID2), Hash2(ID2), Hash3(ID2), or the like; or, Hash(ID2,ID1), Hash1(ID2,ID1), Hash2(ID2,ID1), Hash3 (ID2,ID1), or the like; or, Hash(ID2,1), Hash1 (ID2,1), Hash2(ID2,1), Hash3 (ID2,1), or the like.

Optionally, the predetermined algorithm may be a public-private key algorithm, and the implicit user identifier information of the first/second user equipment is a key generated by mapping the user identifier of the first/second user equipment by using the public-private key algorithm; or, the predetermined algorithm is an encryption algorithm based on a public-private key algorithm, and the implicit user identifier information of the first/second user equipment is an encryption value obtained by encrypting the user identifier of the first/second user equipment by using a key that is generated by mapping the user identifier of the first/second user equipment by using the public-private key algorithm.

The public-private key algorithm is a very common encryption algorithm, and a basic idea of the algorithm is to use a private key to generate a public key, the public key may be open to the public, a user equipment needs to save the private key, and a packet encrypted by using the public key can only be decrypted by using the private key.

If the predetermined algorithm is a public-private key algorithm, the implicit user identifier information of the first/second user equipment may be a public key generated by using the public-private key algorithm and by using the user identifier of the first/second user equipment as a private key. If the predetermined algorithm is an encryption algorithm of a public-private key algorithm, the implicit user identifier information of the first/second user equipment may be an encryption value obtained after the corresponding user identifier of the first/second user equipment is encrypted by using a public key that is generated by using the public-private key algorithm and by using the user identifier of the first/second user equipment as a private key.

The second situation: the user identifier and the implicit user identifier information of the first/second user equipment may be two identifiers that are allocated by a server to the first/second user equipment and are corresponding to a same user equipment. A mapping relationship exists between the two identifiers. For example, an application server allocates a first identifier and a second identifier to each second user equipment, and both the first identifier and the second identifier may be updated by the application server.

Further, to enable the first user equipment to quickly obtain, according to the implicit user identifier information of the second user equipment and from a stored correspondence between the user identifier of the first user equipment and the implicit user identifier information of the first user equipment and a stored correspondence between a user identifier of at least one other user equipment and implicit user identifier information of the at least one other user equipment, a user identifier corresponding to the implicit user identifier information of the second user equipment, the first message further includes: an identifier type of the second user equipment.

Further, when the first message includes the implicit user identifier information of the first user equipment, to enable the first user equipment to quickly determine, according to the first message, whether the first user equipment is a specific user equipment that the second user equipment is searching for, the first message further includes: a type of the user identifier of the first user equipment.

It should be noted that, the user identifier of the first/second user equipment is an identifier of a user using the first/second user equipment. The user identifier of the first/second user equipment may be a code word, the user identifier of the first user equipment may include a code word and a code signal that are negotiated by the first user equipment and the second user equipment in advance, and the code word and the code signal are used to securely discover the first user equipment and the second user equipment, for example, the code word may be "It is a fine day today". The user identifier of the first/second user equipment may also be information such as a number or a letter, or a word for discovery, such as service information, geographic location information, community information, job information, a key word, business card information, and matching information of a user using the first/second user equipment, for example, the user identifier of the first/second user equipment may be personal information of a user, such as a phone number, a QQ number, or a mailbox, or may be information combining the foregoing personal information such as a phone number, a QQ number, and a mailbox of a user. The type of the user identifier of the first/second user equipment may be a QQ number, a phone number, a user name of a mailbox, or the like, or may be a combination of identifiers such as a QQ number, a phone number, and a user name of a mailbox.

In the following two different scenarios, content included in the first message may be different.

The first scenario: the second user equipment needs to discover, in coverage of the broadcast message, one or more first user equipment with which the second user equipment has a friend relationship. In this scenario, the first message only includes related information of the second user equipment, and in this case, the implicit user identifier information of the second user equipment does not include related information of the user identifier of the first user equipment.

In the first scenario, the implicit user identifier information of the second user equipment is the information obtained after hash conversion is performed on the user identifier of the second user equipment by using the hash function; or, the key generated by mapping the user identifier of the second user equipment by using the public-private key algorithm; or, the encryption value obtained by encrypting the user identifier of the second user equipment by using the key that is generated by mapping the user identifier of the second user equipment by using the public-private key algorithm; or, one of the two identifiers allocated by the server to the second user equipment.

The second scenario: the second user equipment only needs to discover several specific first user equipment with which a user of the second user equipment has a friend relationship. In this scenario, in addition to related information of the user identifier of the second user equipment, the first message further needs to include related information of the user identifier of the first user equipment.

In the second scenario, the first message may include the implicit user identifier information of the second user equipment, where the implicit user identifier information of the second user equipment is information obtained after hash conversion is performed on the user identifier of the second user equipment and user identifiers of the several specific first user equipment; or, the first message may include the implicit user identifier information of the second user equipment and implicit user identifier information of the several specific first user equipment.

202: The first user equipment obtains, according to the correspondences stored in the first user equipment, the user identifier corresponding to the implicit user identifier information of the second user equipment.

The first user equipment matches the implicit user identifier information of the second user equipment with the correspondence between the user identifier of the first user equipment and the implicit user identifier information of the first user equipment and the correspondence between a user identifier of at least one other user equipment and implicit user identifier information of the at least one other user equipment that are stored in the first user equipment. If matching of the implicit user identifier information of the second user equipment is successful, the user identifier corresponding to the implicit user identifier information of the second user equipment is obtained according to the correspondences.

203: The first user equipment determines, in the user identifier corresponding to the implicit user identifier information of the second user equipment, the user identifier of the second user equipment, to discover a user of the second user equipment.

When the first user equipment obtains, according to the correspondences stored in the first user equipment, only one user identifier corresponding to the implicit user identifier information of the second user equipment, the user identifier is the user identifier of the second user equipment, and the first user equipment successfully discovers the user of the second user equipment. When the first user equipment obtains, according to the correspondences stored in the first user equipment, multiple user identifiers corresponding to the implicit user identifier information of the second user equipment, the first user equipment may interact with the second user equipment by using the user identifier of the first user equipment and the user identifiers corresponding to the implicit user identifier information of the second user equipment, to further complete verification on the second user equipment, to determine the user identifier of the second user equipment.

In the foregoing process, the second user equipment broadcasts the implicit user identifier information of the second user equipment, so that the first user equipment determines the user identifier of the second user equipment, that is, the first user equipment determines a user identity of the second user equipment, and the first user equipment successfully discovers the second user equipment. To enable the second user equipment to discover the first user equipment, and determine the user identifier of the first user equipment, the method may further include the following steps 204: The first user equipment sends, to the second user equipment, a second message at least including implicit user identifier information of the first user equipment.

In this case, the second message may only include the related information of the user identifier of the first user equipment.

The implicit user identifier information of the first user equipment is information obtained after hash conversion is performed on the user identifier of the first user equipment by using the hash function; or, the key generated by mapping the user identifier of the first user equipment by using the public-private key algorithm; or, the encryption value obtained by encrypting the user identifier of the first user equipment by using the key that is generated by mapping the user identifier of the first user equipment by using the public-private key algorithm; or, one of the two identifiers allocated by the server to the first user equipment.

Certainly, to enable the second user equipment to determine whether a user discovered by the first user equipment is the user of the second user equipment, the second message may further include related information that is obtained by using the user identifier of the first user equipment and the user identifier of the second user equipment, where the user identifier of the second user equipment is determined by the first user equipment.

The second message may also include the implicit user identifier information of the first user equipment, where the implicit user identifier information of the first user equipment is information obtained after hash conversion is performed, by using the hash function, on the user identifier of the first user equipment and the user identifier of the second user equipment, where the user identifier of the second user equipment is determined by the first user equipment; or, the second message may include the implicit user identifier information of the first user equipment and the implicit user identifier information of the second user equipment, where the implicit user identifier information of the second user equipment is determined by the first user equipment.

205: The second user equipment obtains, according to a correspondence between the user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment.

The first user equipment matches the implicit user identifier information of the first user equipment with implicit user identifier information of a device that is stored in the second user equipment; if matching of the implicit user identifier information of the first user equipment is successful, the user identifier corresponding to the implicit user identifier information of the first user equipment is obtained according to the correspondences.

The second user equipment determines whether the received implicit user identifier information of the first user equipment is stored. If the received implicit user identifier information of the first user equipment is stored, matching performed by the second user equipment on the implicit user identifier information of the first user equipment is successful. If matching of the implicit user identifier information of the first user equipment is successful, the second user equipment uses a user identifier of a device that is corresponding to the stored implicit user identifier information of the first user equipment as the user identifier corresponding to the implicit user identifier information of the first user equipment.

206: The second user equipment determines, in the user identifier corresponding to the implicit user identifier information of the first user equipment, the user identifier of the first user equipment, to discover a user of the first user equipment.

When the second user equipment obtains, according to the correspondences stored in the second user equipment, only one user identifier corresponding to the implicit user identifier information of the first user equipment, the user identifier is the user identifier of the first user equipment, and the second user equipment successfully discovers the first user equipment. When the second user equipment obtains, according to the correspondences stored in the second user equipment, multiple user identifiers corresponding to the implicit user identifier information of the first user equipment, the second user equipment may interact with the first user equipment by using the user identifier of the second user equipment and the user identifiers corresponding to the implicit user identifier information of the first user equipment, to further complete verification on the first user equipment, to determine the user identifier of the first user equipment.

It should be noted that, after the second user equipment determines, in the user identifier corresponding to the implicit user identifier information of the first user equipment, the user identifier of the first user equipment, the second user equipment determines a user identity of the first user equipment, that is, the second user equipment successfully discovers the first user equipment.

Further, to enable the second user equipment to quickly determine the user identifier of the first user equipment, the second message further includes the type of the user identifier of the first user equipment.

It should be noted that, when only one user identifier corresponding to the implicit user identifier information of the second user equipment is stored in the first user equipment, the first user equipment may directly determine the user identifier corresponding to the implicit user identifier information of the second user equipment as the user identifier of the second user equipment. When at least two user identifiers corresponding to the implicit user identifier information of the second user equipment are stored in the first user equipment, the first user equipment needs to further determine, in the user identifiers corresponding to the implicit user identifier information of the second user equipment, the user identifier of the second user equipment.

When the implicit user identifier information of the second user equipment is information obtained after hash conversion is performed on the user identifier of the second user equipment by using a hash function, implicit user identifier information of a same second user equipment may be obtained from user identifiers of different user equipment because hash conversion has a feature that different inputs may be hashed to be identical outputs and therefore a unique input value cannot be determined from hash values. For example, if plaintext identifiers of user equipment stored in the first user equipment are: ID21, ID22, ID23, ID24, and ID25 respectively, the first user equipment performs hashing processing on the stored plaintext identifiers of the user equipment, and if obtained hash values of ID21, ID22, and ID23 are the same as the received implicit user identifier information of the second user equipment, user identifiers corresponding to the implicit user identifier information of the second user equipment are ID21, ID22, and ID23. Therefore, when the first user equipment obtains multiple user identifiers that are corresponding to the implicit user identifier information of the second user equipment, the first user equipment cannot determine, in the user identifiers corresponding to the implicit user identifier information of the second user equipment, the user identifier of the second user equipment.

Figure 3A:
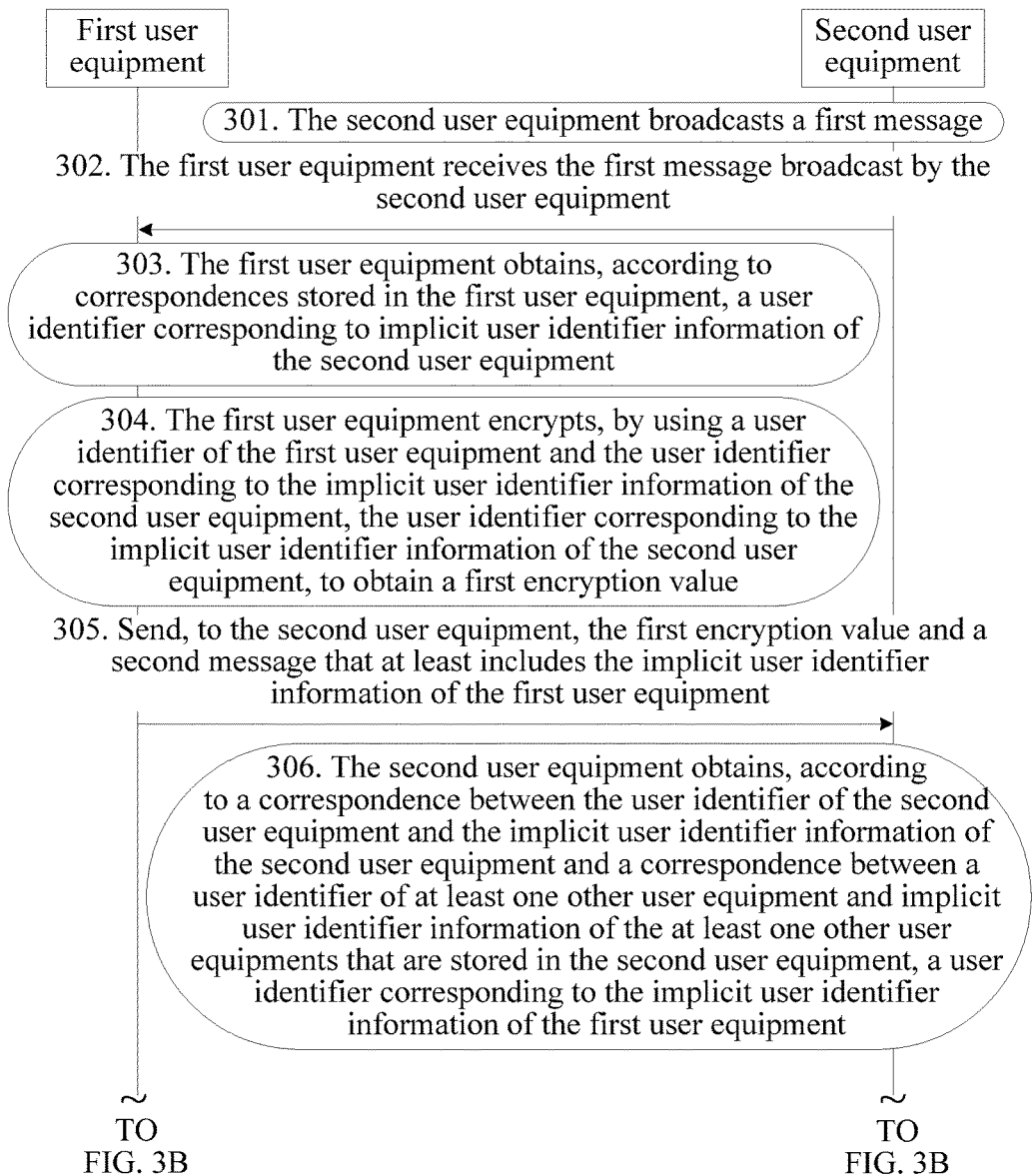

To enable the first user equipment to determine, in the user identifier corresponding to the implicit user identifier information of the second user equipment, the user identifier of the second user equipment, to discover the user of the second user equipment, as shown in FIG. 3A and FIG. 3B, the method includes 301: A second user equipment broadcasts a first message, where the first message at least includes implicit user identifier information of the second user equipment.

302: A first user equipment receives the first message broadcast by the second user equipment, where the first message at least includes the implicit user identifier information of the second user equipment.

The second user equipment broadcasts the implicit user identifier information of the second user equipment by using a broadcast message, and when the first user equipment is in a broadcast range of the second user equipment, the first user equipment may receive the broadcast message of the second user equipment.

303: The first user equipment obtains, according to the correspondences stored in the first user equipment, a user identifier corresponding to the implicit user identifier information of the second user equipment.

The first user equipment matches the implicit user identifier information of the second user equipment with a correspondence between a user identifier of the first user equipment and implicit user identifier information of the first user equipment and a correspondence between a user identifier of at least one other user equipment and implicit user identifier information of the at least one other user equipment that are stored in the first user equipment. If matching of the implicit user identifier information of the second user equipment is successful, the user identifier corresponding to the implicit user identifier information of the second user equipment is obtained according to the correspondences.

304: The first user equipment encrypts, by using the user identifier of the first user equipment and the user identifier corresponding to the implicit user identifier information of the second user equipment, the user identifier corresponding to the implicit user identifier information of the second user equipment, to obtain a first encryption value.

The first user equipment constructs an encryption key by using a determined decryption key, and then, encrypts, by using an encryption algorithm and the constructed encryption key, the user identifier corresponding to the implicit user identifier information of the second user equipment, to obtain the first encryption value.

The determined decryption key refers to an output value obtained by using the user identifier of the first user equipment and the user identifier corresponding to the implicit user identifier information of the second user equipment as inputs of a first decryption function.

For a symmetric encryption algorithm, an encryption key is the same as a decryption key; and for an asymmetric encryption algorithm, an encryption key needs to be constructed according to a decryption key, so that a key for decryption is the determined decryption key.

By using the symmetric encryption algorithm as an example, the first user equipment uses an output value that is obtained by using the user identifier of the first user equipment and the user identifier corresponding to the implicit user identifier information of the second user equipment as inputs of a first decryption function, as an encryption key, and encrypts the user identifier corresponding to the implicit user identifier information of the second user equipment by using the encryption key and the encryption algorithm, to obtain the first encryption value.

For example, if there are multiple user identifiers corresponding to the implicit user identifier information of the second user equipment, which are ID21, ID22, and ID23 respectively, the user identifier of the first user equipment is ID1, and f(x,y) is a function for constructing an encryption key, encryption keys formed by the user identifier of the first user equipment and the user identifiers corresponding to the implicit user identifier information of the second user equipment are: f(ID1,ID21), f(ID1,ID22), and f(ID1,ID23) respectively. If the encryption algorithm is E(f(x,y),y), the first encryption values are E(f(ID1,ID21),ID21), E(f(ID1,ID22),ID22), and E(f(ID1,ID23),ID23).

305: Send, to the second user equipment, the first encryption value and a second message that at least includes the implicit user identifier information of the first user equipment.

The first user equipment may first send, to the second user equipment, the second message at least including the implicit user identifier information of the first user equipment, and then send the first encryption value to the second user equipment; or may simultaneously send, to the second user equipment, the first encryption value and the second message at least including the implicit user identifier information of the first user equipment.

306: The second user equipment obtains, according to a correspondence between a user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment.

It should be noted that, the method of obtaining, by the second user equipment according to a correspondence between the user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment may be the same as the method of obtaining, by the first user equipment according to a correspondence between the user identifier of the first user equipment and the implicit user identifier information of the first user equipment and a correspondence between a user identifier of at least one other user equipment and implicit user identifier information of the at least one other user equipment that are stored in the first user equipment, a user identifier corresponding to the implicit user identifier information of the second user equipment, which is not described again in this embodiment of the present disclosure.

307: The second user equipment decrypts the first encryption value by using the user identifier of the second user equipment and the user identifier corresponding to the implicit user identifier information of the first user equipment, to determine the user identifier of the first user equipment.

After receiving the first encryption value, the second user equipment may use an output value that is obtained by using the user identifier of the second user equipment and the user identifier corresponding to the implicit user identifier information of the first user equipment as inputs of a second decryption function, as a decryption key of the first encryption value, to decrypt the first encryption value.

The output value obtained by using the user identifier of the second user equipment and the user identifier corresponding to the implicit user identifier information of the first user equipment as the inputs of the second decryption function is used as the decryption key of the first encryption value to decrypt the first encryption value, to obtain a decryption result.

If the decryption result includes the user identifier of the second user equipment, the decryption result is correct, and the second user equipment obtains the user identifier of the first user equipment according to the decryption key of the first encryption value and performs step 308 to step 310.

If the decryption result does not include the user identifier of the second user equipment, the decryption result is incorrect, and step 311 is performed.

The foregoing process enables the second user equipment to determine the user identifier of the first user equipment, thereby discovering the first user equipment. To enable the first user equipment to determine the user identifier of the second user equipment, to discover the second user equipment, the method further includes the following steps 308: The second user equipment encrypts the determined user identifier of the first user equipment by using the user identifier of the second user equipment and the obtained user identifier of the first user equipment, to obtain a second encryption value.

After obtaining the user identifier of the first user equipment, the second user equipment constructs an encryption key by using an agreed decryption key, and then, encrypts the obtained user identifier corresponding to the implicit user identifier information of the first user equipment by using the encryption algorithm and the constructed encryption key, to obtain the second encryption value.

The determined decryption key refers to an output value obtained by using the user identifier of the second user equipment and the obtained user identifier corresponding to the implicit user identifier information of the first user equipment as inputs of the second decryption function.

By using a symmetric encryption algorithm as an example, the second user equipment uses an output value that is obtained by using the user identifier of the second user equipment and the user identifier of the first user equipment as inputs of the second decryption function, as an encryption key, and encrypts the obtained user identifier corresponding to the implicit user identifier information of the first user equipment by using the encryption key and the encryption algorithm, to obtain the second encryption value.

For example, if the determined user identifier of the first user equipment is ID1, the user identifier of the second user equipment is ID2, and $g(x,y)$ is a function for constructing an encryption key, an encryption key formed by the user identifier of the second user equipment and the obtained user identifier corresponding to the implicit user identifier information of the first user equipment is $g(ID2,ID1)$. If the encryption algorithm is $E(g(x,y),x)$, the second encryption value is $E(g(ID2,ID1),ID1)$.

309: The second user equipment sends the second encryption value to the first user equipment.

310: The first user equipment decrypts the second encryption value by using the user identifier of the first user equipment and the user identifier corresponding to the implicit user identifier information of the second user equipment, to obtain a decryption result.

After receiving the second encryption value, the first user equipment may use the output value that is obtained by using the user identifier of the first user equipment and the user identifier corresponding to the implicit user identifier information of the second user equipment as the inputs of the first decryption function, as the decryption key of the second encryption value, to decrypt the second encryption value, to obtain a decryption result, and obtain the user identifier of the second user equipment according to the decryption result.

If the decryption result includes the user identifier of the first user equipment, the decryption result is correct, and the first user equipment determines the user identifier that is in the inputs of the corresponding first decryption function and is corresponding to the implicit user identifier information of the second user equipment, as the user identifier of the second user equipment, and performs step 313.

If the decryption result does not include the user identifier of the first user equipment, the decryption result is incorrect, and step 312 is performed.

311: The second user equipment sends a discovery failure message to the first user equipment.

In this case, the discovery of the first user equipment and the second user equipment fails, and a discovery process ends.

312: The first user equipment sends a discovery failure message to the second user equipment.

313: The first user equipment sends a discovery success message to the second user equipment.

Optionally, to reduce an arithmetic quantity of the first user equipment, and enable user equipment to identify each other more quickly, the correspondences stored in the first user equipment may further include: the decryption key used to decrypt the second encryption value and the encryption value obtained by encrypting the user identifier of the first user equipment.

After receiving the second encryption value, the first user equipment performs matching on the second encryption value; if matching of the second encryption value is successful, the user identifier of a user equipment corresponding to the second encryption value is used as the user identifier of the second user equipment.

After receiving the second encryption value, the first user equipment determines, according to the stored encryption value obtained by encrypting the user identifier of the first user equipment, whether the second encryption value is stored in the first user equipment; if the second encryption value is stored in the first user equipment, the user identifier of the user equipment corresponding to the second encryption value is used as the user identifier of the second user equipment. The second encryption value is not decrypted by using the decryption key and the decryption function, which reduces the arithmetic quantity of the first user equipment, and improves a speed of identification between the first user equipment and the second user equipment.

Further, optionally, to reduce an arithmetic quantity of the first user equipment during encryption, the correspondences may further include: the encryption value obtained by encrypting the user identifier of the second user equipment, or the encryption value obtained by encrypting the user identifier of the second user equipment and the decryption key used to decrypt the first encryption value.

In this case, when the first user equipment obtains the user identifier corresponding to the implicit user identifier information of the second user equipment, and encrypts the user identifier corresponding to the implicit user identifier information of the second user equipment, the first user equipment uses the encryption value corresponding to the user identifier corresponding to the implicit user identifier information of the second user equipment as the first encryption value, instead of obtaining the first encryption value by using the encryption key and the encryption function when the first user equipment needs to obtain the first encryption value, which reduces the arithmetic quantity of the first user equipment, and improves a speed of identification between the first user equipment and the second user equipment.

Figure 4A:
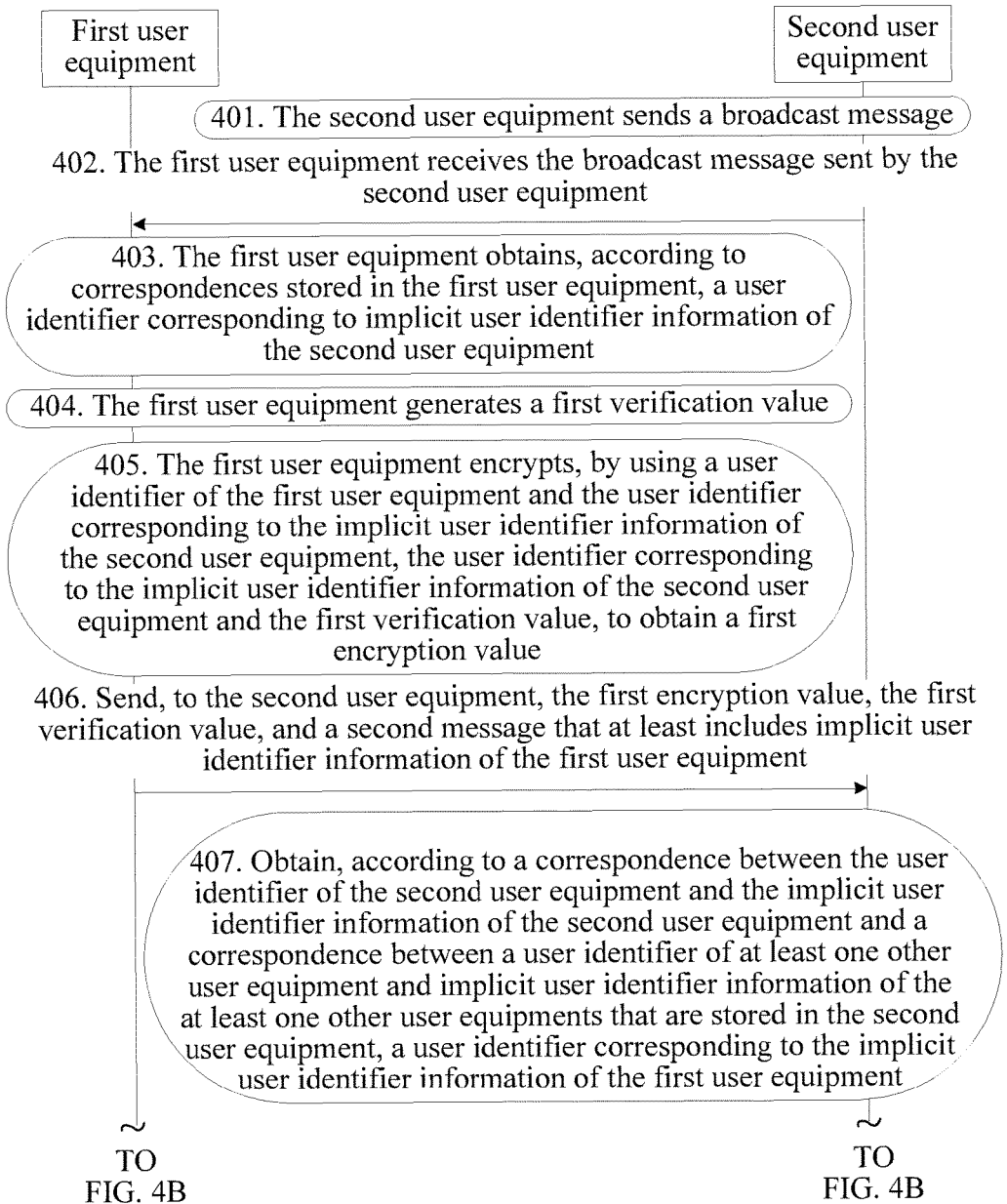
FIG. 4A and FIG. 4B are a schematic diagram of interaction of another method for discovering a device user according to an embodiment of the present disclosure.
Figure 4B:
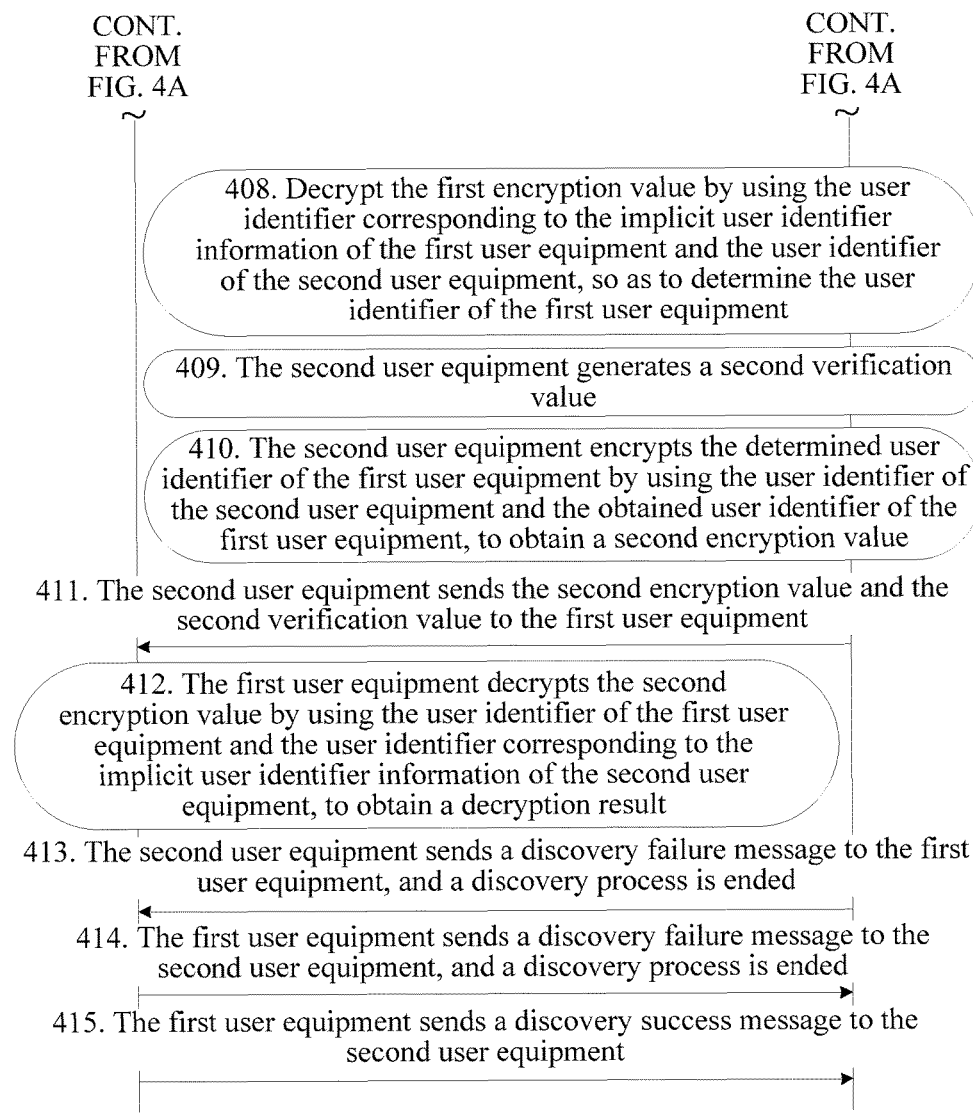

To prevent a spoofing attack, and reduce situations of misjudgment between the first user equipment and the second user equipment, a verification value may be added to communication information between the first user equipment and the second user equipment, and the verification value may be at least one random number. As shown in FIG. 4A and FIG. 4B, the first user equipment and the second user equipment verify a user of each other by adding, to interaction information between the first user equipment and the second user equipment, related information of a verification value generated by the first user equipment and related information of a verification value generated by the second user equipment, and the method includes 401: A second user equipment sends a broadcast message, where the broadcast message includes implicit user identifier information of the second user equipment.

402: A first user equipment receives the broadcast message sent by the second user equipment, where the broadcast message includes the implicit user identifier information of the second user equipment.

403: The first user equipment obtains, according to the correspondences stored in the first user equipment, a user identifier corresponding to the implicit user identifier information of the second user equipment.

404: The first user equipment generates a first verification value.

405: The first user equipment encrypts, by using a user identifier of the first user equipment and the user identifier corresponding to the implicit user identifier information of the second user equipment, the first verification value and the user identifier corresponding to the implicit user identifier information of the second user equipment, to obtain a first encryption value.

The first user equipment may use the first verification value and the user identifier corresponding to the implicit user identifier information of the second user equipment as inputs of the encryption algorithm, and encrypt the first verification value and the user identifier corresponding to the implicit user identifier information of the second user equipment by using the encryption key and the encryption algorithm; the first user equipment may also simultaneously use the first verification value and the user identifier corresponding to the implicit user identifier information of the second user equipment as inputs of the encryption algorithm, and encrypt the first verification value and the user identifier corresponding to the implicit user identifier information of the second user equipment by using the encryption key and the encryption algorithm.

For a specific encryption process, refer to the description in the foregoing embodiments of the present disclosure, and details are not described again in this embodiment of the present disclosure.

406: The first user equipment sends, to the second user equipment, the first encryption value, the first verification value, and a second message that at least includes implicit user identifier information of the first user equipment.

The first user equipment may first send, to the second user equipment, the second message at least including the implicit user identifier information of the first user equipment, and then send the first encryption value and the first verification value to the second user equipment; or may simultaneously send a second message to the second user equipment, where the second message at least includes the implicit user identifier information of the first user equipment, the first encryption value, and the first verification value.

407: The second user equipment obtains, according to a correspondence between a user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment.

408: The second user equipment decrypts the first encryption value by using the user identifier of the second user equipment and the user identifier corresponding to the implicit user identifier information of the first user equipment, to determine the user identifier of the first user equipment.

If a decryption result includes the user identifier of the second user equipment and the first verification value, the decryption result is correct, and the second user equipment obtains the user identifier of the first user equipment and performs step 409 to step 412.

If the decryption result does not include the user identifier of the second user equipment or the first verification value, the decryption result is incorrect, and step 413 is performed.

409: The second user equipment generates a second verification value.

410: The second user equipment encrypts the determined user identifier of the first user equipment by using the user identifier of the second user equipment and the obtained user identifier of the first user equipment, to obtain a second encryption value.

The second user equipment may use the user identifier of the first user equipment and the second verification value as inputs of the encryption algorithm, and encrypt the user identifier of the first user equipment and the second verification value by using the encryption key and the encryption algorithm; the second user equipment may also simultaneously use the user identifier of the first user equipment and the second verification value as the inputs of the encryption algorithm, and encrypt the user identifier of the first user equipment and the second verification value by using the encryption key and the encryption algorithm.

411: The second user equipment sends the second encryption value and the second verification value to the first user equipment.

412: The first user equipment decrypts the second encryption value by using the user identifier of the first user equipment and the user identifier corresponding to the implicit user identifier information of the second user equipment, to obtain a decryption result.

If the decryption result includes the user identifier of the first user equipment and the second verification value, the decryption result is correct, and the first user equipment obtains the user identifier of the second user equipment and performs step 415.

If the decryption result does not include the user identifier of the first user equipment or the second verification value, the decryption result is incorrect, and step 414 is performed.

413: The second user equipment sends a discovery failure message to the first user equipment, and a discovery process ends.

414: The first user equipment sends a discovery failure message to the second user equipment, and a discovery process ends.

415: The first user equipment sends a discovery success message to the second user equipment.

Certainly, it is also possible that when interaction information between the first user equipment and the second user equipment includes a verification value, a same verification value is in the interaction information between the first user equipment and the second user equipment, and at least one user equipment of the first user equipment and the second user equipment needs to encrypt the verification value, so that when the second user equipment discovers the first user equipment, if the first user equipment is a disguised user equipment, the first user equipment cannot accurately decrypt related information of the verification value sent by the second user equipment. Similarly, when the first user equipment discovers the second user equipment, if the second user equipment is a disguised user equipment, the second user equipment cannot accurately decrypt related information of the verification value sent by the first user equipment, so that the first user equipment determines a spoofing attack.

It can be understood by a person skilled in the technical field of the present disclosure that, the method of adding the verification value to the interaction information between the first user equipment and the second user equipment to prevent a spoofing attack is a manner commonly used by the person skilled in this technical field, and the manner of adding the verification value to the interaction information between the first user equipment and the second user equipment to prevent a spoofing attack is not limited in this embodiment of the present disclosure.

It should be noted that, the encryption value involved in the present disclosure and obtained by encrypting the user identifier and the verification value may be an encryption value obtained by encrypting the user identifier and the verification value together, or an encryption value obtained by separately encrypting the user identifier and the verification value.

This embodiment of the present disclosure provides a method for discovering a device user, in which a first message that is sent by a second user equipment and at least includes implicit user identifier information of the second user equipment is received; a user identifier corresponding to the implicit user identifier information of the second user equipment is obtained according to the correspondences stored in the first user equipment; and a user identifier of the second user equipment is determined in the user identifier corresponding to the implicit user identifier information of the second user equipment, to discover a user of the second user equipment. In this solution, user identifiers of the first user equipment and the second user equipment are processed, and when the first user equipment interacts with the second user equipment, implicit user identifier information of the first user equipment and implicit user identifier information of the second user equipment are used, which can ensure security of user identifier information of the user equipment, so that the user equipment discover each other securely.

Embodiment 3

Figure 5:
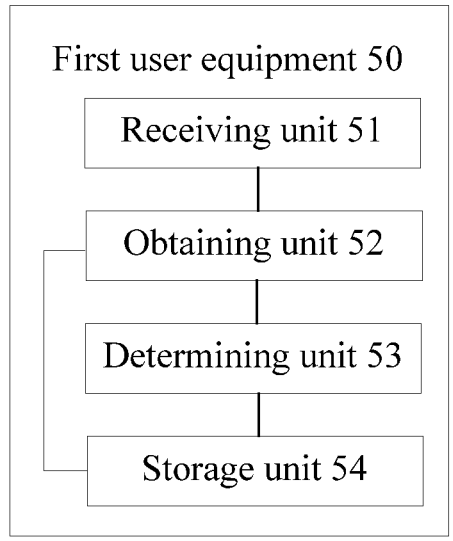
FIG. 5 is a schematic structural diagram of a user equipment according to an embodiment of the present disclosure.

This embodiment of the present disclosure provides a user equipment, where the user equipment is a first user equipment. As shown in FIG. 5, the first user equipment 50 includes: a storage unit 54, a receiving unit 51, an obtaining unit 52, and a determining unit 53.

The storage unit 54 stores a correspondence between a user identifier of the first user equipment and implicit user identifier information of the first user equipment and a correspondence between a user identifier of at least one other user equipment and implicit user identifier information of the at least one other user equipment.

The receiving unit 51 is configured to receive a first message that is sent by a second user equipment and at least includes implicit user identifier information of the second user equipment.

The obtaining unit 52 is configured to obtain, according to the correspondences stored in the storage unit, a user identifier corresponding to the implicit user identifier information of the second user equipment.

The determining unit 53 is configured to determine, in the user identifier corresponding to the implicit user identifier information of the second user equipment, a user identifier of the second user equipment, to discover a user of the second user equipment.

The user identifier of the first/second user equipment is a plaintext user identifier of the user identifier of the first/second user equipment, and the implicit user identifier information of the first/second user equipment is information obtained after at least the user identifier of the first/second user equipment is processed by using a predetermined function or a predetermined algorithm; or, the user identifier and the implicit user identifier information of the first/second user equipment are two identifiers that are allocated by a server to the first/second user equipment and are corresponding to a same user equipment.

Further, the predetermined function is a hash function, and the implicit user identifier information of the first/second user equipment is information obtained after hash conversion is performed on at least the user identifier of the first/second user equipment by using the hash function.

Further, the predetermined algorithm is a public-private key algorithm, and the implicit user identifier information of the first/second user equipment is a key generated by mapping the user identifier of the first/second user equipment by using the public-private key algorithm, or, the predetermined algorithm is an encryption algorithm based on a public-private key algorithm, and the implicit user identifier information of the first/second user equipment is an encryption value obtained by encrypting the user identifier of the first/second user equipment by using a key that is generated by mapping the user identifier of the first/second user equipment by using the public-private key algorithm.

Figure 6:
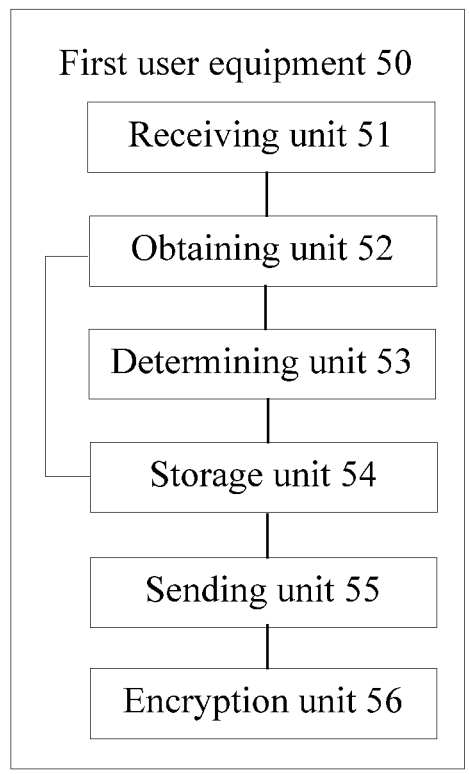
FIG. 6 is a schematic structural diagram of another user equipment according to an embodiment of the present disclosure.

Further, as shown in FIG. 6, the first user equipment 50 further includes: a sending unit 55.

The sending unit 55 is configured to send, to the second user equipment, a second message at least including the implicit user identifier information of the first user equipment, so that the second user equipment obtains, according to a correspondence between the user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment, and determines, in the user identifier corresponding to the implicit user identifier information of the first user equipment, the user identifier of the first user equipment.

Further, as shown in FIG. 6, the first user equipment 50 further includes: an encryption unit 56.

The encryption unit 56 is configured to encrypt, by using the user identifier of the first user equipment and the user identifier corresponding to the implicit user identifier information of the second user equipment, the user identifier corresponding to the implicit user identifier information of the second user equipment, to obtain a first encryption value.

The sending unit 55 is further configured to send the first encryption value to the second user equipment.

That the second user equipment determines, in the user identifier corresponding to the implicit user identifier information of the first user equipment, the user identifier of the first user equipment is that the second user equipment decrypts the first encryption value by using the user identifier of the second user equipment and the user identifier corresponding to the implicit user identifier information of the first user equipment, to determine the user identifier of the first user equipment, to discover a user of the first user equipment.

The receiving unit 51 is further configured to: after the second user equipment obtains the user identifier of the first user equipment, and obtains a second encryption value by encrypting the determined user identifier of the first user equipment by using the user identifier of the second user equipment and the obtained user identifier of the first user equipment, receive the second encryption value sent by the second user equipment.

The determining unit 53 is configured to decrypt the second encryption value by using the user identifier of the first user equipment and the user identifier corresponding to the implicit user identifier information of the second user equipment, to obtain a decryption result, where if the decryption result includes the user identifier of the first user equipment, the decryption result is correct, and the first user equipment determines the corresponding user identifier corresponding to the implicit user identifier information of the second user equipment as the user identifier of the second user equipment.

Further, the first message further includes a type of the user identifier of the second user equipment and/or the implicit user identifier information of the first user equipment; or, the first message further includes a type of the user identifier of the second user equipment, and/or, the implicit user identifier information of the first user equipment and a type of the user identifier of the first user equipment.

Further, the second message further includes indication information indicating that the type of the user identifier of the first user equipment is the implicit user identifier information.

This embodiment of the present disclosure provides a first user equipment. The receiving unit receives a first message that is sent by a second user equipment and at least includes implicit user identifier information of the second user equipment; the obtaining unit obtains, according to correspondences stored in the first user equipment, a user identifier corresponding to the implicit user identifier information of the second user equipment; the determining unit determines, in the user identifier corresponding to the implicit user identifier information of the second user equipment, a user identifier of the second user equipment, to discover a user of the second user equipment. In this solution, user identifiers of the first user equipment and the second user equipment are processed, and when the first user equipment interacts with the second user equipment, implicit user identifier information of the first user equipment and implicit user identifier information of the second user equipment are used, which can ensure security of user identifier information of the user equipment, so that the user equipment discover each other securely.

Embodiment 4

Figure 7:
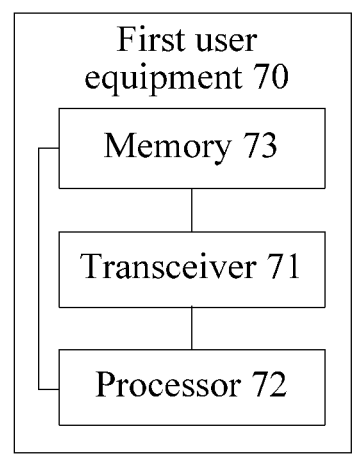
FIG. 7 is a schematic structural diagram of still another user equipment according to an embodiment of the present disclosure.

This embodiment of the present disclosure provides a user equipment, where the user equipment is a first user equipment. As shown in FIG. 7, the first user equipment 70 includes: a memory 73, a transceiver 71, and a processor 72.

The memory 73 stores a correspondence between a user identifier of the first user equipment and implicit user identifier information of the first user equipment and a correspondence between a user identifier of at least one other user equipment and implicit user identifier information of the at least one other user equipment.

The transceiver 71 is configured to receive a first message that is sent by a second user equipment and at least includes implicit user identifier information of the second user equipment.

The processor 72 is configured to obtain, according to the correspondences stored in the memory 73, a user identifier corresponding to the implicit user identifier information of the second user equipment.

The processor 72 is further configured to determine, in the user identifier corresponding to the implicit user identifier information of the second user equipment, a user identifier of the second user equipment, to discover a user of the second user equipment.

The user identifier of the first/second user equipment is a plaintext user identifier of the user identifier of the first/second user equipment, and the implicit user identifier information of the first/second user equipment is information obtained after at least the user identifier of the first/second user equipment is processed by using a predetermined function or a predetermined algorithm; or, the user identifier and the implicit user identifier information of the first/second user equipment are two identifiers that are allocated by a server to the first/second user equipment and are corresponding to a same user equipment.

Further, the predetermined function is a hash function, and the implicit user identifier information of the first/second user equipment is information obtained after hash conversion is performed on at least the user identifier of the first/second user equipment by using the hash function.

Further, the predetermined algorithm is a public-private key algorithm, and the implicit user identifier information of the first/second user equipment is a key generated by mapping the user identifier of the first/second user equipment by using the public-private key algorithm, or, the predetermined algorithm is an encryption algorithm based on a public-private key algorithm, and the implicit user identifier information of the first/second user equipment is an encryption value obtained by encrypting the user identifier of the first/second user equipment by using a key that is generated by mapping the user identifier of the first/second user equipment by using the public-private key algorithm.

Further, the transceiver 71 is further configured to send, to the second user equipment, a second message at least including the implicit user identifier information of the first user equipment, so that the second user equipment obtains, according to a correspondence between the user identifier of the second user equipment and the implicit user identifier information of the second user equipment and a correspondence between a user identifier of at least one other user equipment and implicit user identifier information of the at least one other user equipment that are stored in the second user equipment, a user identifier corresponding to the implicit user identifier information of the first user equipment; and determine, in the user identifier corresponding to the implicit user identifier information of the first user equipment, the user identifier of the first user equipment, to discover a user of the first user equipment.

Further, the processor 72 is further configured to encrypt, by using the user identifier of the first user equipment and the user identifier corresponding to the implicit user identifier information of the second user equipment, the user identifier corresponding to the implicit user identifier information of the second user equipment, to obtain a first encryption value.

The transceiver 71 is further configured to send the first encryption value to the second user equipment.

That the second user equipment determines, in the user identifier corresponding to the implicit user identifier information of the first user equipment, the user identifier of the first user equipment is that the second user equipment decrypts the first encryption value by using the user identifier of the second user equipment and the user identifier corresponding to the implicit user identifier information of the first user equipment, to determine the user identifier of the first user equipment.

The transceiver 71 is further configured to: after the second user equipment obtains the user identifier of the first user equipment, and obtains a second encryption value by encrypting the determined user identifier of the first user equipment by using the user identifier of the second user equipment and the obtained user identifier of the first user equipment, receive the second encryption value sent by the second user equipment.

The processor 72 is configured to decrypt the second encryption value by using the user identifier of the first user equipment and the user identifier corresponding to the implicit user identifier information of the second user equipment, to obtain a decryption result, where if the decryption result includes the user identifier of the first user equipment, the decryption result is correct, and the first user equipment determines the corresponding user identifier corresponding to the implicit user identifier information of the second user equipment as the user identifier of the second user equipment.

Further, the first message further includes a type of the user identifier of the second user equipment and/or the implicit user identifier information of the first user equipment; or, the first message further includes a type of the user identifier of the second user equipment, and/or, the implicit user identifier information of the first user equipment and a type of the user identifier of the first user equipment.

Further, the second message further includes indication information indicating that the type of the user identifier of the first user equipment is the implicit user identifier information.

This embodiment of the present disclosure provides a first user equipment. The transceiver receives a first message that is sent by a second user equipment and at least includes implicit user identifier information of the second user equipment; the processor obtains, according to correspondences stored in the first user equipment, a user identifier corresponding to the implicit user identifier information of the second user equipment; the processor determines, in the user identifier corresponding to the implicit user identifier information of the second user equipment, a user identifier of the second user equipment, to discover a user of the second user equipment. In this solution, user identifiers of the first user equipment and the second user equipment are processed, and when the first user equipment interacts with the second user equipment, implicit user identifier information of the first user equipment and implicit user identifier information of the second user equipment are used, which can ensure security of user identifier information of the user equipment, so that the user equipment discover each other securely.

It should be noted that, the "first", the "second", and the like in the present disclosure are all merely used for the purpose of distinguishing, and have no other specific meanings.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. A person of ordinary skill in the art may understand and implement the embodiments of the present disclosure without creative efforts.

Based on the description of the foregoing implementation manners, a person skilled in the art may clearly understand that the present disclosure may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer user device (which may be a personal computer, a server, a network user device, and the like) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for discovering a device user, comprising:
receiving, by a first user equipment (UE) from a second UE, a first message comprising implicit user identifier information of the second UE;
obtaining, by the first UE, at least one user identifier corresponding to the implicit user identifier information of the second UE;
determining a second UE user identifier using the at least one user identifier, wherein the second UE user identifier identifies a user of the second UE;
encrypting, using a first UE user identifier and the second UE user identifier, the at least one user identifier corresponding to the implicit user identifier information of the second UE, to obtain a first encryption value; and
sending the first encryption value to the second UE,
wherein the second UE user identifier is a plaintext user identifier,
wherein a key is generated by processing the second UE user identifier using a public-private key algorithm, and
wherein the implicit user identifier information of the second UE is an encryption value obtained by encrypting the second UE user identifier using the key.

2. The method according to claim 1, wherein the second UE user identifier and the implicit user identifier information of the second UE are two identifiers allocated by a server to the second UE and correspond to the same UE.

3. The method according to claim 1, further comprising:
sending, to the second UE, a second message at least comprising the implicit user identifier information of the first UE; and
determining, in the at least one user identifier corresponding to the implicit user identifier information of the first UE, a first UE user identifier to discover a user of the first UE.

4. The method according to claim 3,
wherein determining, by the second UE, in the at least one user identifier corresponding to the implicit user identifier information of the first UE, the first UE user identifier comprises:
decrypting the first encryption value using the second UE user identifier and the at least one user identifier corresponding to the implicit user identifier information of the first UE, to determine the first UE user identifier;
encrypting, by the second UE, a determined user identifier of the first UE using the second UE user identifier and an obtained user identifier of the first UE to obtain a second encryption value;
sending the second encryption value to the first UE; and
receiving the second encryption value from the second UE, and
wherein determining, in the at least one user identifier corresponding to the implicit user identifier information of the second UE, the second UE user identifier comprises:
decrypting, using the first UE user identifier and the at least one user identifier corresponding to the implicit user identifier information of the second UE, the second encryption value to obtain a decryption result, wherein the decryption result is correct when the decryption result comprises the first UE user identifier, and the first UE determines the at least one user identifier corresponding to the implicit user identifier information of the second UE as the second UE user identifier.

5. The method according to claim 3, wherein the second message further comprises indication information indicating that the type of the first UE user identifier is the implicit user identifier information.

6. The method according to claim 3, wherein the first message comprises at least one of:
the implicit user identifier information of the first UE; and
a type of the first UE user identifier.

7. A user equipment (UE) for discovering a device user, wherein the UE is a first UE, and wherein the first UE comprises:
a memory configured to store executable instructions;
a transceiver configured to:
receive, from a second UE, a first message comprising implicit user identifier information of the second UE; and
send a first encryption value to the second UE; and
a processor coupled to the memory and the transceiver, wherein the processor is configured to:
obtain at least one user identifier corresponding to the implicit user identifier information of the second UE;
determine a second UE user identifier to identify a user of the second UE; and
encrypt, using a first UE user identifier and the second UE user identifier, the at least one user identifier corresponding to the implicit user identifier information of the second UE, to obtain the first encryption value,
wherein the second UE user identifier is a plaintext user identifier,
wherein a key is generated by processing the second UE user identifier using a public-private key algorithm, and
wherein the implicit user identifier information of the second UE is an encryption value obtained by encrypting the second UE user identifier using the key.

8. The UE according to claim 7, wherein the user identifier and the implicit user identifier information of the second UE are two identifiers that are allocated by a server to the second UE and are corresponding to the same UE.

9. The UE according to claim 7, wherein the transceiver is further configured to:
   send, to the second UE, a second message at least comprising the implicit user identifier information of the first UE; and
   determine, in the at least one user identifier corresponding to the implicit user identifier information of the first UE, a first UE user identifier, to discover a user of the first UE.

10. The UE according to claim 9, wherein determining by the second UE, in the at least one user identifier corresponding to the implicit user identifier information of the first UE, the first UE user identifier comprises decrypting the first encryption value using the second UE user identifier and the at least one user identifier corresponding to the implicit user identifier information of the first UE, to determine the first UE user identifier, wherein the transceiver is further configured to:
   obtain a second encryption value by encrypting a determined user identifier of the first UE using the second UE user identifier and an obtained user identifier of the first UE after the second UE obtains the first UE user identifier; and
   receive the second encryption value sent by the second UE, and
   wherein the processor is further configured to decrypt the second encryption value using the first UE user identifier and the at least one user identifier corresponding to the implicit user identifier information of the second UE, to obtain a decryption result, wherein the decryption result is correct when the decryption result comprises the first UE user identifier, and determine the at least one user identifier corresponding to the implicit user identifier information of the second UE as the second UE user identifier.

11. The UE according to claim 9, wherein the second message further comprises indication information indicating that the type of the first UE user identifier is the implicit user identifier information.

12. The UE according to claim 9, wherein the first message comprises at least one of:
   the implicit user identifier information of the first UE; and
   a type of the first UE user identifier.

* * * * *